March 19, 1929.  E. R. WOLFERT  1,705,695
REGULATOR
Filed Oct. 20, 1927
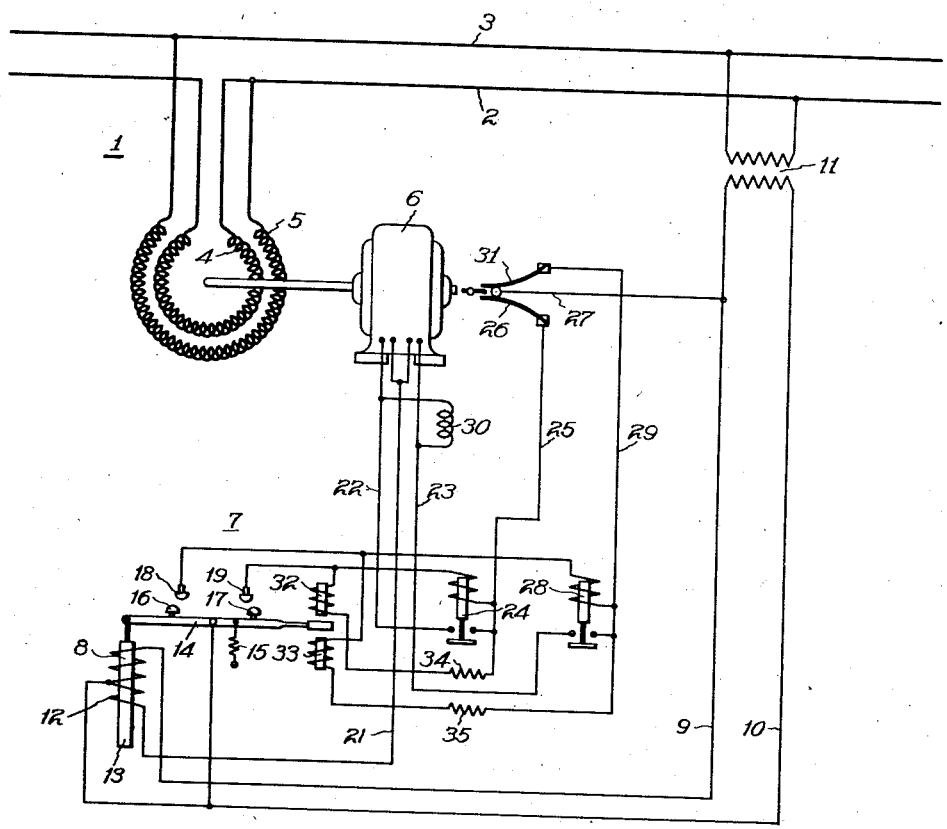
INVENTOR
Edward R. Wolfert
BY
ATTORNEY Patented Mar. 19, 1929.

1,705,695

UNITED STATES PATENT OFFICE.

EDWARD R. WOLFERT, OF WILKINSBURG, PENNSYLVANIA, ASSIGNOR TO WESTINGHOUSE ELECTRIC & MANUFACTURING COMPANY, A CORPORATION OF PENNSYLVANIA.

REGULATOR.

Application filed October 20, 1927. Serial No. 227,434.

My invention relates to a regulator system and especially to a system for regulating the voltage or other electrical quantity of an alternating-current circuit.

In certain regulator systems, such as those embodying motor-driven feeder regulators of the induction type, the operation of the motors is controlled by means of relays of a special form commonly designated as contact-making voltmeters. The variations in the voltage on the circuit with which the regulator is associated, causes the voltmeter to close the one or the other of two motor circuits and thereby to so excite the motor as to operate the induction regulator in the one or in the other direction, in order to restore the voltage to the desired or normal value.

In induction-regulator installations, where no separate source of energy is available for operating the motor, the contact-making voltmeter and the motor may be energized from the same voltage transformer. In such installations, when the voltage on the power line rises, one pair of contacts of the contact-making voltmeter, or primary relay, closes and causes the closing of the motor circuit. The closing of the motor circuit causes the voltage across the secondary of the supply transformer to drop because of the impedance of the transformer and the lagging current drawn from the transformer by the motor. This drop in voltage causes the primary relay to open its contacts and stop the motor, and, as the action repeats, causes an intermittent or pumping action of the relay.

For the purpose of automatically compensating for the impedance drop of the transformer, I provide an auxiliary winding of the proper number of turns on the contact-making voltmeter and provide for energizing this auxiliary winding when the motor windings are energized. The auxiliary winding has the effect of adding to the electromagnet of the primary relay a force equal to that lost by the voltage drop caused by connecting the motor to the transformer, so that the primary relay will change its position only upon a change in the voltage across the primary of the transformer, which corresponds to the voltage of the power line.

An object of my invention is, therefore, to compensate the contact-making voltmeter or primary relay of a regulator so that the relay will change its position only upon a change in voltage of the power line being regulated.

My invention will be better understood by reference to the accompanying drawing in which the single figure is a schematic diagram of circuits and apparatus employed in an embodiment of the invention.

Referring to the drawing, my invention is illustrated as employed in connection with a regulator 1 of the induction type for so regulating the voltage of a single-phase alternating-current circuit 2—3 as to maintain it substantially constant.

The induction regulator comprises relatively movable series and shunt windings 4 and 5 and a motor 6 for operating the movable or rotor winding in accordance with the control effected by the primary relay, or contact-making voltmeter, 7. The relay 7 is provided with an actuating winding 8 that is connected, by means of conductors 9 and 10, to the secondary winding of a transformer 11, the primary winding of which is connected across the power-circuit conductors 2—3. The relay 7 is also provided with an auxiliary winding 12 that is energized, upon the operation of the motor 6, in a manner to be later explained. The two windings 8 and 12 actuate a core member 13 that is connected to operate a pivoted lever 14. A spring member 15 biases the lever 14 to partially overcome the weight of the core 13. The lever 14 carries contact members 16 and 17 which are adapted to engage the contact members 18 and 19, respectively, to effect operation of the motor 6.

The motor 6 is provided with windings for operating the motor in the one or the other direction. One side of each winding is fed from a common conductor 21, connected in series-circuit relation with the auxiliary relay winding 12 and conductor 10 to one side of the secondary winding of the transformer 11. The other sides of the motor windings are fed through conductors 22 and 23, respectively. The circuit through the conductor 22 is completed by means of the relay 24, conductor 25, limit switch 26 and conductor 27, back to the other side of the transformer 11. The circuit through the conductor 23 is completed through the relay 28, conductor 29, limit switch 31 and conductor 27 to the transformer 11. A reactor 30 is connected between the conductors 22 and 23 so that, when one of the conductors 22 and 23 is energized directly through the relay contact members, the other of these two conductors will be energized through the reactor 30. Thus both motor windings will be energized.

Electromagnets 32 and 33 are provided, having windings in parallel-circuit relation, respectively, to the windings of the relays 24 and 28. The electromagnets 32 and 33 are energized, upon closing of the relay contact members 17—19 or 16—18, respectively, to bias the relay lever 14 to prevent chattering of the contact members. Resistors 34 and 35 may be connected in circuit with the windings of electromagnets 32 and 33 to limit the current in the circuits.

The operation of the system is as follows: If the voltage in the power-circuit conductors 2—3 rises above the desired value, the voltage impressed upon the relay winding 8 will increase, causing the core 13 to be moved upwardly and bringing the contact members 16 and 18 into engagement. A circuit is thereby completed through the winding of relay 28, which closes, and completes a circuit through the windings of the motor 6, causing it to operate in a direction to decrease the voltage of the power circuit. Since the motor circuit is completed through the conductor 21 and the auxiliary winding 12 of the relay, additional force is added to the relay. The auxiliary winding 12 is designed to have sufficient ampere turns to offset the loss in the ampere turns of the winding 8 caused by the drop in voltage of the transformer 11 when current is drawn therefrom to supply the motor 6. As the voltage of the supply circuit reaches its desired value, the relay will again return to its illustrated or open position, opening the relay 28 and causing the motor 6 to come to rest.

If the voltage of the power circuit 2—3 falls below the desired value, the core 13 will move downwardly, causing the contact members 17 and 19 to be brought into engagement, thus closing a circuit through the relay 24 and energizing the motor 6 to operate in a direction that will operate the induction regulator 1 to increase the voltage on the power circuit 2—3. Since the motor circuit is again completed through the conductor 21 and the auxiliary winding 12 of the primary relay, causing the drop in ampere turns of the winding 8, occasioned by connecting the motor to the circuit to be compensated, the relay 7 will be actuated only in response to a change in the voltage of the circuit 2—3.

Since many modifications may be made in the circuits and apparatus illustrated without departing from the spirit of my invention, I do not wish it to be limited otherwise than by the scope of the appended claims.

I claim as my invention:

1. In a regulator system, an alternating-current circuit, a regulator for controlling the voltage of said circuit, a motor for operating said regulator, a relay for controlling the operation of said motor from said circuit and provided with an electromagnet comprising a core member and a winding, a transformer energized from said circuit and having a winding connected to said relay winding, an auxiliary winding for said relay magnet and means for energizing and deenergizing said auxiliary winding in accordance with the operation of said motor to compensate for voltage drop occasioned thereby.

2. In a regulator system, an alternating-current circuit, a regulator for controlling the voltage of said circuit, a motor for operating said regulator, a relay for controlling the operation of said motor by controlling its connection to said circuit and provided with an electromagnet comprising a core member and a winding, a transformer energized from said circuit and having a winding connected to said relay winding, and means for varying the effective turns of said electromagnet in accordance with the motor operation to compensate for voltage drop occasioned thereby.

3. In a regulator system, an alternating-current circuit, a regulator for controlling the voltage of said circuit, a motor for operating said regulator, a relay for controlling the operation of said motor and provided with an electromagnet comprising a core member and a winding, a transformer energized from said circuit for supplying power to said motor and having a winding connected to said relay winding, and means for increasing the number of effective turns of said relay winding upon the operation of said motor.

4. In a regulator system, an alternating-current circuit, a regulator for controlling the voltage of said circuit, a motor for operating said regulator, a relay for controlling the operation of said motor and provided with an electromagnet comprising a core member and a winding, a transformer energized from said circuit for supplying power to said motor and having a winding connected to said relay winding, and an auxiliary winding for said relay connected in series-circuit relation with said motor.

5. In a regulator system, an alternating-current circuit, a regulator for controlling the voltage of said circuit, a motor for operating said regulator, a source of power for said motor comprising a transformer connected to said circuit, a relay for controlling the operation of said motor comprising an electromagnet having a winding connected to be energized in accordance with the voltage of said transformer, and a winding connected in series-circuit relation with said motor.

6. In a regulator system, an alternating-current circuit, a regulator for controlling the voltage of said circuit, a motor for operating said regulator, a source of power for said motor comprising a transformer connected to said circuit, a relay for controlling the operation of said motor comprising an electromagnet having a winding connected to be energized in accordance with the voltage of said transformer, and means for varying the effective turns of said electromagnet to compensate for the impedance drop in said transformer occasioned by the operation of said motor.

In testimony whereof, I have hereunto subscribed my name this 5th day of October, 1927.

EDWARD R. WOLFERT.